United States Patent [19]

Barboux et al.

[11] Patent Number: 5,135,732
[45] Date of Patent: Aug. 4, 1992

[54] METHOD FOR PREPARATION OF LIMN$_2$O$_4$ INTERCALATION COMPOUNDS AND USE THEREOF IN SECONDARY LITHIUM BATTERIES

[75] Inventors: Philippe Barboux, Paris, France; Frough K. Shokoohi, Bedminster; Jean-Marie Tarascon, Martinsville, both of N.J.

[73] Assignee: Bell Communications Research, Inc., Livingston, N.J.

[21] Appl. No.: 690,080

[22] Filed: Apr. 23, 1991

[51] Int. Cl.$^5$ .............................................. C01G 45/02
[52] U.S. Cl. .................................. 423/593; 423/605; 423/599; 423/49; 423/50; 423/183; 423/179.5; 429/224
[58] Field of Search ............... 423/605, 593, 599, 641, 423/49, 50, 179.5, 183; 429/224, 194

[56] References Cited

U.S. PATENT DOCUMENTS 4,904,552  2/1990  Furukawa et al. ................. 429/197
4,980,251  12/1990  Thackeray et al. ................. 429/224

OTHER PUBLICATIONS

Sol-Gel Synthesis of Manganese Oxides Journal of Solid State Chemistry 88 325-333 (1990) Bach et al.
Chemical Processing for Ceramics (and Polymers) Materials Science Research vol. 11 pp. 67-76 Plenum Press, N.Y. 1978, P. E. D. Morgan.

Primary Examiner—Theodore Morris
Assistant Examiner—Edward Squillante
Attorney, Agent, or Firm—Leonard Charles Suchyta; Lionel N. White

[57] ABSTRACT

Method is described for the low temperature preparation of the spinel LiMn$_2$O$_4$ phase which is an intercalable compound of interest for use in lithium secondary batteries. This phase can be prepared in bulk or thick film form at temperatures less than 400° C. using acetate precursors.

4 Claims, 3 Drawing Sheets

METHOD FOR PREPARATION OF LIMN₂O₄ INTERCALATION COMPOUNDS AND USE THEREOF IN SECONDARY LITHIUM BATTERIES

FIELD OF THE INVENTION

This invention relates to a method for the preparation of fine powders and/or thick films of lithium containing ternary oxides. More specifically, the present invention relates to the low temperature synthesis of $LiMn_2O_4$ and $LiCoO_2$ which are intercalable compounds of interest for secondary batteries.

Heretofore, the lithium containing ternary oxides have been prepared by mixing the carbonates and oxides of the constituent compounds and heating the mixture at temperatures within the range of 700°–800° C. Although the resultant compositions have proven satisfactory for most purposes, studies have revealed that the high temperatures employed in the synthesis thereof ofttimes adversely affect the electrochemical properties of the compositions. In light of the fact that the lithium-based intercalation compounds of $LiMn_2O_4$ and $LiCoO_2$ have sparked widespread interest for use in the next generation of rocking chair batteries, workers in the art have focused their attention upon the development of alternate techniques for obtaining these compositions. Specifically, new routes have been sought to attain a method yielding materials of controlled morphology and grain size to improve battery behavior.

BACKGROUND OF THE INVENTION

In accordance with the present invention, this end has been attained by a novel processing sequence wherein a weak acetate ligand in combination with a hydroxide solution with a balanced pH permits the formation of fine particles of a mixed hydroxide-acetate composition. More specifically, there is described herein a method for the synthesis of $LiMn_2O_4$ and $LiCoO_2$ phases by a novel sol-gel process involving the condensation of oxide networks from solution precursors. Briefly, this involves hydrolyzing manganese or cobalt acetates or other carboxylates in an aqueous solution, the hydrolysis being promoted by the addition of the hydroxides of lithium and ammonium which control the pH of the solution. Hydrolysis is initiated by the addition of lithium hydroxide and completed by the use of a base that can be removed thermally. This base may be selected from among any organic base or ammonium hydroxide which is preferred for use herein. This low temperature process yields a gel-like product which may be used to prepare either bulk or thick films of $LiMn_2O_4$ or $LiCoO_2$ which evidence electrochemical properties suitable for use in rocking chain batteries.

BRIEF DESCRIPTION OF THE DRAWINGS

The invention will be more readily understood by reference to the following detailed description taken in conjunction with the accompanying drawing wherein.

DETAILED DESCRIPTION

Figure 1:
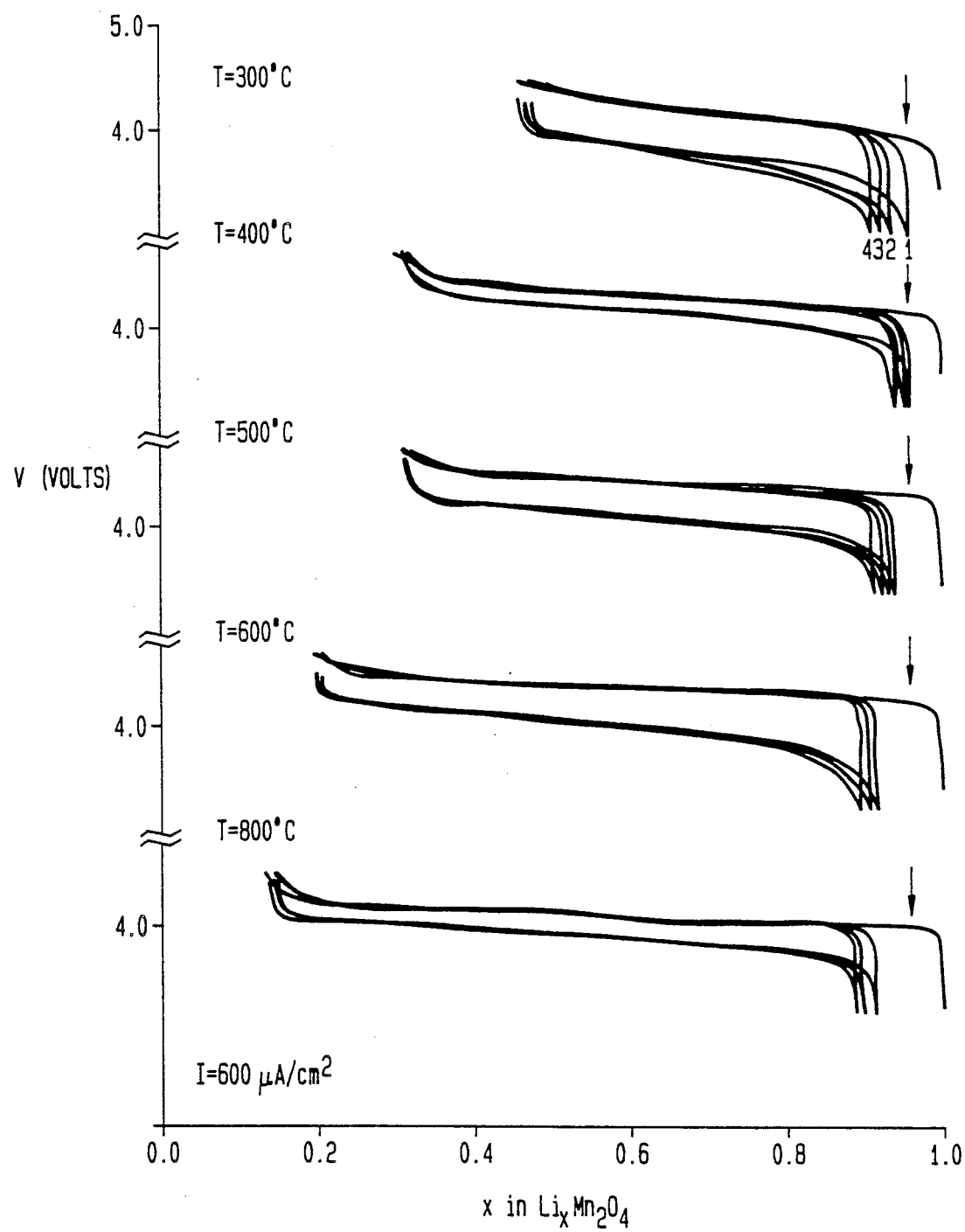
FIG. 1 is a graphical representation on coordinates of $x$ in $Li_xMn_2O_4$ against voltage in volts showing the cycling characteristics between 4.5 and 3.5 volts at a current density of 600 $\mu A/cm^2$ for powder compositions of lithium manganese oxide annealed at temperatures from 300°–800° C. used initially as the positive electrode in a secondary lithium battery in which lithium metal is used as the negative electrode.

The initial step in the practice of the present invention involves preparing an acetate precursor for the ternary oxide. This end is effected by admixing, with rapid stirring, an acetate of manganese or cobalt and the hydroxides of lithium and ammonium in an amount sufficient to yield the stoichiometric phase of the ternary oxide. In this process, the ammonium hydroxide is employed primarily for the purpose of adjusting the pH to a value of approximately 7, the point at which a controlled precipitation occurs. The required amount of ammonium is defined by the sum of hydroxyl groups from lithium hydroxide and from ammonium hydroxide equal to the normality of the transition metal cation, Mn, or for Co in $LiCoO_2$. Upon such mixing, a gelatinous precipitate is formed instantaneously. Studies of the resultant precipitates reveal that the manganese composition is stable for only a few hours in contrast with the cobalt composition which is stable for several weaks. Accordingly, the manganese must be protected from oxygen to avoid the formation of $Mn^{3+}$ leading to the precipitation of $Mn_2O_3$.

Following, the gelatinous precipitate so formed is dried thermally at a temperature ranging from 60° C.–150° C., the specific temperature chosen being dependent upon the composition and desired use thereof. Thus, for example, heating the manganese composition at a temperature of 90° C. permits formation of a viscous solution which can be deposited upon a suitable substrate by spin coating which permits subsequent synthesis of $LiMn_2O_4$ thick films. Heating of the gelatinous precipitate at the higher temperature (150° C.) results in the formation of a xerogel of small grain size.

Then, the resultant xerogels of manganese and cobalt are heated to a temperature within the range of 200°–500° C. to remove the acetate. At 400° C. the manganese composition becomes a pure $LiMn_2O_4$ phase. In order to attain the cobalt composition of corresponding purity, heating should be continued to 500° C.

An exemplary embodiment of the practice of the present invention is set forth below. It will be appreciated by those skilled in the art that this embodiment is presented solely for purposes of exposition and is not to be construed as limiting.

EXAMPLE

Compositions selected for use included a 0.8 M/l solution of manganese acetate, lithium hydroxide (1 M/l) and ammonium hydroxide (3 M/l). The manganese and lithium solutions were employed in stoichiometric amounts to yield the required phase of $LiMn_2O_4$. The ammonium hydroxide was employed in an amount sufficient to furnish 2 hydroxyl ions per metal ion. The hydroxides were quickly added to the manganese acetate solution with violent stirring, so resulting in the instantaneous formation of a gelatinous precipitate, the manganese solution being protected against oxygen to avoid formation of $Mn^{+3}$. The precipitate was then dried by heating up to 150° C. to yield a homogeneous xerogel in which the lithium and manganese ions were well mixed. Finally, the dried precipitate was annealed at a temperature within the range of 200°–400° C. to yield the acetate free $LiMn_2O_4$ phase which comprised grains or crystallites ranging in size between 0.3 $\mu$m and 1 $\mu$m. The resulting $LiMn_2O_3$ powders prepared at 300° C. and 400° C. were then compared with similar powders prepared at temperatures of 500°, 600°, and 800° C. and their intercalation properties assessed. This end was attained using swagelock test cells that were assembled in a helium dry-box. Approximately 20 mg of $LiMn_2O_4$ powder was mixed with 10% carbon black, pressed into a pellet and used as the positive electrode with lithium as the negative electrode. Both electrodes were separated by a porous glass filter soaked in an electrolyte prepared by dissolving 1 M/l $LiClO_4$ and 1M and 12-crown-4 ether in propylene carbonate. Cycling data was then obtained and plotted in graphical form.

With reference now to FIG. 1, there is shown a graphical representation on coordinates of $Li_xMn_2O_4$ against voltage in volts showing the cycling data over a range of potential from 4.5–3.5 volts for the foregoing compositions annealed at temperatures from 300°–800° C. at a current density of 600 $\mu A/cm^2$. The assembled cell is first charged to remove the Li ions within $Li_x$-$Mn_2O_4$, so that the cathode then becomes the open structure spinel $\lambda$-$Mn_2O_4$.

Figure 2:
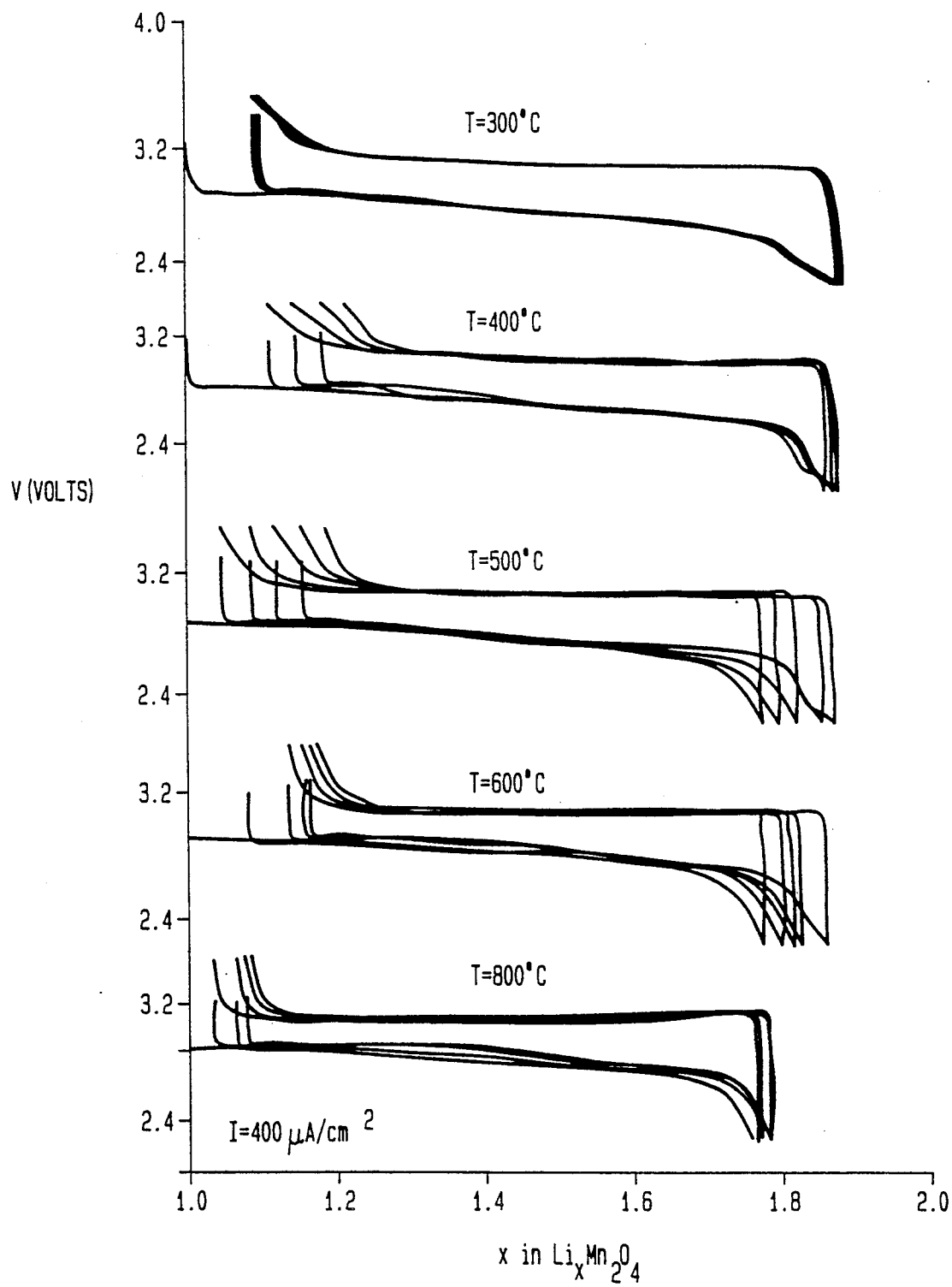
FIG. 2 is a graphical representation on coordinates of $x$ in $Li_xMn_2O_4$ for $x$ greater than one but less than 2 against voltage in volts showing the cycling characteristics between 3.5 and 2.2 volts at a current density of 400 $\mu A/cm^2$ for compositions of lithium manganese oxide powders annealed at temperatures from 300°–800° C. when used as positive electrodes in secondary lithium batteries.

The assembled cells containing $Li_xMn_2O_4$ powders were automatically tested, equivalently charged and discharged up to four cycles at a constant current while potential was monitored as a function of time. A review of FIG. 1 reveals that the cycling data was in the range of potential of 4.5–3.5 volts which corresponds to the first lithium intercalation plateau for intercalation of 1 Li into $\lambda$-$Mn_2O_4$, and over the range of potential 3.5–2.2 volts (shown on the same coordinates in FIG. 2) which corresponds to the second lithium intercalation plateau into $LiMn_2O_4$ to give $Li_2Mn_2O_4$. In both FIGURES, it will be noted that the capacity of the cells and their cycling behavior are comparable to or better than similar properties for the samples prepared at the higher temperatures. Accordingly, the data reveals that the low temperature process, which yields finer size particles of $LiMn_2O_4$, does not affect the capacity of the cells and enhances their cycling behavior.

Figure 3:
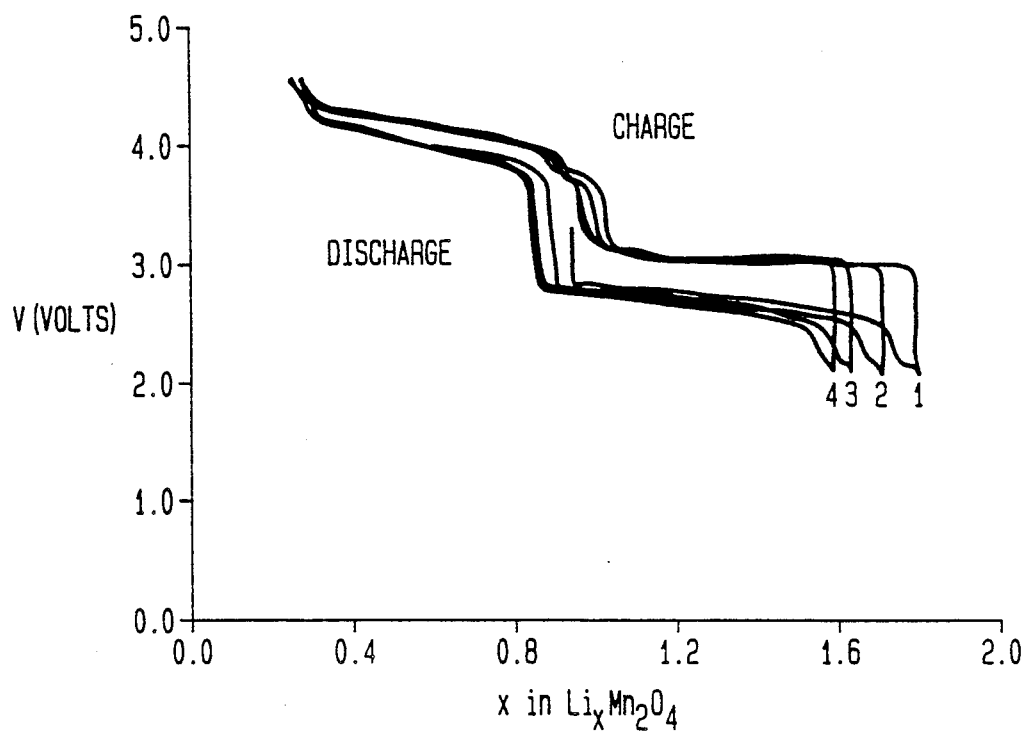
FIG. 3 is a graphical representation on coordinates of $x$ in $Li_xMn_2O_4$ against voltage in volts showing typical composite cycling behavior over a potential range of 4.5–2.2 volts at a current density of 800 $\mu A/cm^2$ for cells using $LiMn_2O_4$ synthesized at 400° C. as the positive electrode in secondary lithium batteries.

With reference now to FIG. 3, there is shown a graphical representation on coordinates of $Li_xMn_2O_4$ content against voltage in volts showing the cycling characteristics between 4.5 and 2 volts, covering both plateaus. Once again, it will be noted that the charge/discharge curves are similar to those previously reported for cells using the $LiMn_2O_4$ phase prepared at 400° C. as the positive electrode.

Figure 4:
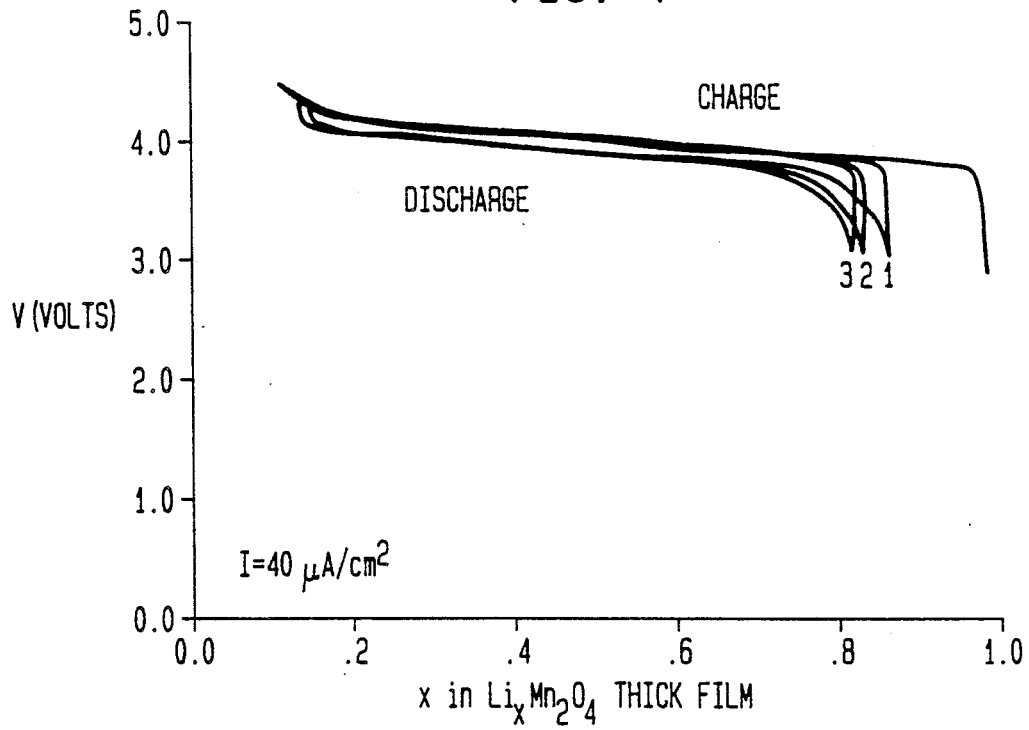
FIG. 4 is a graphical representation on coordinates of $x$ in $Li_xMn_2O_4$ against voltage in volts showing the cycling behavior between 4.5 and 3.5 volts at a current density of 40 $\mu A/cm^2$ for a cell using a 10 micron $LiMn_2O_4$ thick film prepared by dipping as the positive electrode in a secondary lithium battery.

A still further advantage of the described solution technique over the prior art solid state reactions is that thick films are attainable. With reference now to FIG. 4, there is shown a graphical representation on coordinates of $Li_xMn_2O_4$ content (thick film) against voltage in volts showing cycling behavior over the range of 4.5–3.0 volts at 400 $\mu A/cm^2$. The electrode was prepared by forming a 10 $\mu$m thick film of $Li_xMn_2O_4$ by dipping a stainless steel substrate into a viscous acetate aqueous solution prepared as described above and then fired for 16 hours at 600° C. The cycling data are similar to that shown for the bulk material.

It will be understood by those skilled in-the-art that the described technique can be used with equivalent efficacy in the preparation of $LiCoO_2$. However, the initial Co-acetate solution will be of a different concentration to attain the required composition which may be prepared in bulk or thick film form. It has also been found that an annealing temperature of 500° C. is generally required to obtain the $LiCoO_2$ phase. Lastly, it has also been found that it is feasible, using acetate precursors, to prepare $Na_xMnO_2$ or $Na_xCoO_2$ in accordance with the described process with NaOH being substituted for LiOH.

What is claimed is:

1. A method of preparing a lithiated manganese oxide intercalation compound comprising the steps of:
    a) mixing in stoichiometric amounts, based on said lithiated manganese oxide compound, aqueous solutions of lithium hydroxide and manganese acetate and a sufficient amount of an aqueous solution of a base selected from the group consisting of organic bases and ammonium hydroxide to establish a solution mixture pH of about 7, thereby initiating the formation of a gelatinous precipitate;
    b) drying said precipitate by heating in the range of 60°–150° C., thereby forming a xerogel; and
    c) annealing said xerogel by heating in the range of 200°–600° C.

2. A method according to claim 1 which comprises the additional steps, prior to said drying step, of:
    a) partially drying said precipitate at about 90° C. to a viscous, coatable gelatinous state; and
    b) coating a film of said viscous precipitate on a substrate.

3. A method according to claim 2 wherein said xerogel film is annealed at about 600° C. for a period of about 16 hours.

4. A method according to claim 1 for preparing a spinel structure lithiated intercalation compound of the formula $LiMn_2O_4$ wherein:
    a) said precipitate is dried at about 150° C.; and
    b) said xerogel is annealed by heating in the range of 200°–400° C. for about 24 hours, thereby forming said lithiated intercalation compound as a powder of submicron particle size.

* * * * *